(12) United States Patent
Cunningham et al.

(10) Patent No.: US 9,566,600 B2
(45) Date of Patent: Feb. 14, 2017

(54) MAINTENANCE DEVICE FOR FASTENERS (71) Applicant: Christopher Cunningham, Palm Coast, FL (US)

(72) Inventors: Christopher Cunningham, Palm Coast, FL (US); David Barnsdale, London (GB)

(73) Assignee: Christopher J. Cunningham, Palm Coast, FL (US)

( * ) Notice: Subject to any disclaimer, the term of this patent is extended or adjusted under 35 U.S.C. 154(b) by 0 days.

(21) Appl. No.: 14/710,003

(22) Filed: May 12, 2015

(65) Prior Publication Data

US 2015/0239000 A1 Aug. 27, 2015

Related U.S. Application Data

(63) Continuation-in-part of application No. 13/595,619, filed on Aug. 27, 2012, now Pat. No. 9,066,582, which is a continuation-in-part of application No. 13/084,112, filed on Apr. 11, 2011, now Pat. No. 8,277,135.

(51) Int. Cl.
*B05C 9/10* (2006.01)
*B05C 9/04* (2006.01)
*F16B 33/00* (2006.01)
*B63B 23/64* (2006.01)

(52) U.S. Cl.
CPC . *B05C 9/10* (2013.01); *B05C 9/04* (2013.01); *F16B 33/00* (2013.01); *B63B 23/64* (2013.01)

(58) Field of Classification Search
CPC .............. B05C 9/04; B05C 9/10; B08B 9/021; B08B 1/00; B08B 9/0436; A46B 2200/3006; A46B 2200/3013; A47L 25/00
USPC ....................................... 401/9–10
See application file for complete search history.

(56) References Cited

U.S. PATENT DOCUMENTS 4,403,363 A * 9/1983 Hess ...................... B08B 9/021
15/104.04
6,106,370 A * 8/2000 Carter .................... B08B 9/021
451/440

* cited by examiner

*Primary Examiner* — Jennifer C Chiang
*Assistant Examiner* — Bradley Oliver
(74) *Attorney, Agent, or Firm* — Stern & Schurin LLP (57) ABSTRACT

There is provided in a preferred embodiment of the present invention a maintenance device having a lubricant reservoir attached to the upper end of a fixed body, and a dynamic body that is slidably engaged and disposed within the fixed body at the lower end thereof. Attached to the base of dynamic body is a trio of cleaning arms. A spring that is internally positioned between the dynamic body and the fixed body biases the dynamic body downward and the cleaning arms to a relaxed position. As the dynamic body retracts upon the application of force by a user, lubricant is released and pumped from the lubricant reservoir and each of the cleaning arms pivot and engage the side wall of the male connector.

23 Claims, 5 Drawing Sheets

MAINTENANCE DEVICE FOR FASTENERS

RELATED APPLICATION

This application is a continuation-in-part application of application Ser. No. 13/595,619 filed on Aug. 27, 2012 and now allowed, which is a continuation-in-part application of application Ser. No. 13/084,112, filed on Apr. 11, 2011 and now patented as U.S. Pat. No. 8,277,135. Application Ser. Nos. 13/595,619 and 13/084,112 are incorporated herein by reference.

FIELD OF THE INVENTION

This invention relates generally to a maintenance device used in the preservation of fasteners. More specifically, this invention involves a device for lubricating and cleaning fasteners. Even more particularly, this invention covers a device used in the context of boat maintenance which is adapted to lubricate and clean snaps that attach tarps or canvas covers to boats.

BACKGROUND OF THE INVENTION

Exposed surfaces of boats are vulnerable to corrosion and weather damage because of their proximity to water, humidity and corrosive salts. Fasteners or snaps on a boat are especially vulnerable to corrosion and dirt and salt build-up because they are usually formed of metal and incorporate semi-confined areas where moisture, dirt and salt can collect. Such fasteners are commonly used to attach canvas tarps for covering a boat when docked. When the fasteners corrode, they become less effective and may fail to properly secure a tarp. Additionally, corroded and discolored fasteners are unsightly and detract from the aesthetic appeal of the boat.

Existing techniques for maintaining the fasteners of a boat may include employing a rag and cleaning chemicals to remove corrosion and salt from the fastener. However, using harsh chemicals to maintain and clean a fastener may cause damage to the surrounding surfaces of the boat. Alternatively, boaters may use a hard tool, such as a brush with metallic bristles or a small flat edge on a screwdriver, to scrape away corrosion. However, utilizing a tool with a metallic end may likewise cause damage to the surface of the boat or the fastener intended to be cleaned.

Another maintenance technique may incorporate the application of a grease-type lubricant, such as petroleum jelly, directly to a fastener with a swab or other applicator in order to protect the fastener from corrosion. However, these types of lubricants are often messy and difficult to work with, making it particularly difficult to apply just enough lubrication to the fastener without applying an excess amount. Petroleum jelly also tends to run and ooze when exposed to the sun for a long period of time.

SUMMARY OF THE INVENTION

In view of the deficiencies and drawbacks in the prior art, it is a primary object of the present invention to provide a maintenance device for a fastener that removes corrosion and dirt and applies lubrication to fasteners to preserve the fastener for an extended period of time.

Another objective of the present invention is to provide a maintenance device is sized and adapted to clean and lubricate standard tarp fasteners.

A further objective of the present invention is to provide a maintenance device that is adapted to clean both male and female ends of a fastener.

A further objective of the present invention is to provide a maintenance device with a self-contained lubrication system that applies an appropriate amount of lubricant to a fastener.

Additional objectives will be apparent from the description of the invention that follows.

In summary, provided in a preferred embodiment of the present invention is a maintenance device having a lubricant reservoir attached to the upper end of a fixed body, and a dynamic body that is slidably engaged and disposed within the fixed body at the lower end thereof. Attached to the dynamic body is a trio of cleaning arms. A spring that is internally positioned between the dynamic body and the fixed body biases the dynamic body downward (when the device is held upright). When the device is pressed against and engages a male portion of the fastener, the dynamic body moves further inward (i.e., inside said fixed body) to a retracted position within the fixed body. As the dynamic body retracts, each of the cleaning arms pivot and engage the side wall of the male connector. With the abrasive surface of the cleaning arm engaging the outer wall of the male-end connector, a twisting movement of the housing removes corrosion, dirt and debris from the male portion of the fastener.

In a preferred embodiment, the maintenance device further includes an abrasive block positioned external of the lubrication reservoir for cleaning a female portion of a fastener.

BRIEF DESCRIPTION OF THE DRAWINGS

The above-described and other advantages and features of the present disclosure will be appreciated and understood by those skilled in the art from the following detailed description and drawings of which.

DETAILED DESCRIPTION OF THE INVENTION

Figure 1:
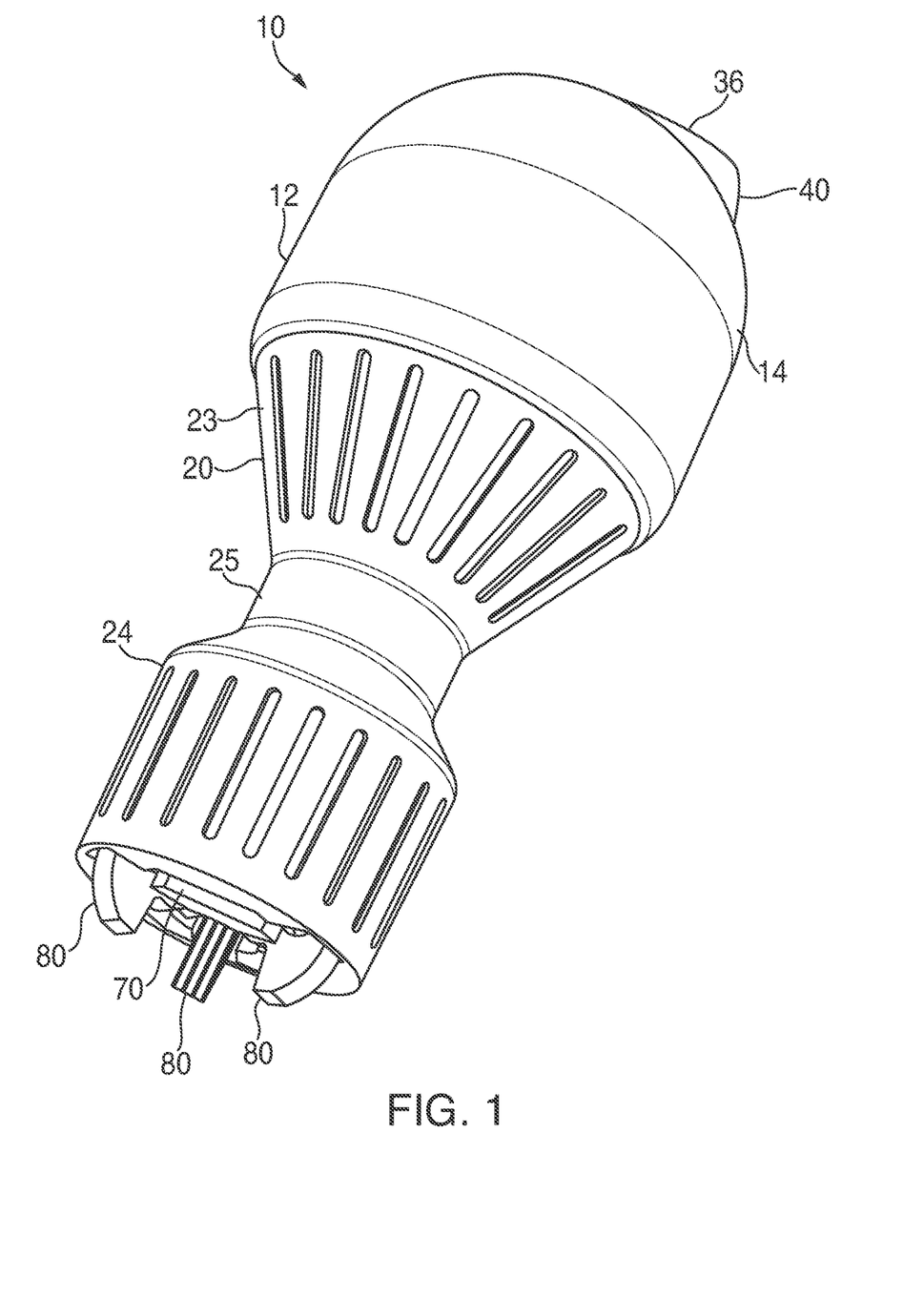
FIG. 1 is a first perspective view of a preferred embodiment of the maintenance device of the present invention.
Figure 2:
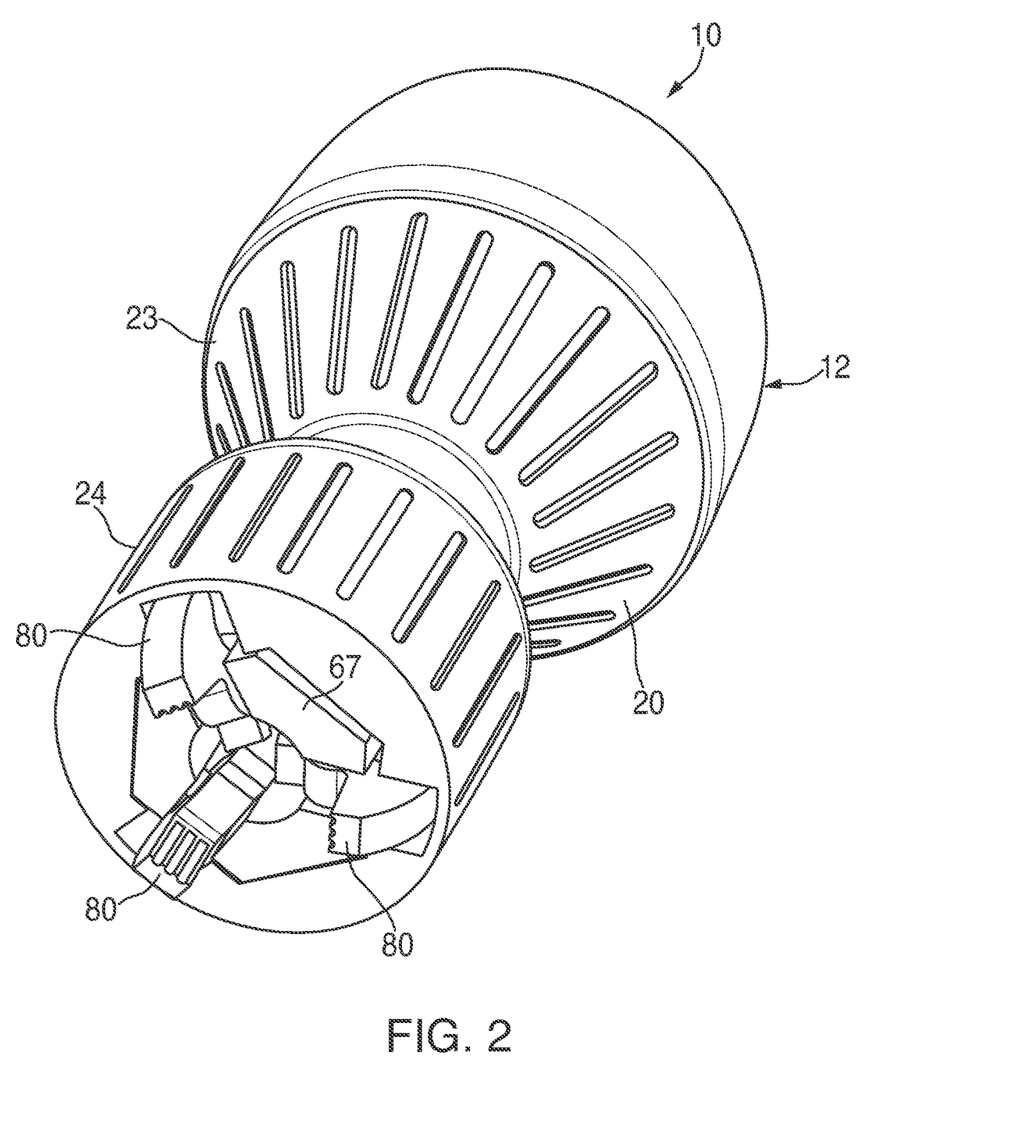
FIG. 2 is a second perspective view of a preferred embodiment of the maintenance device showing the bottom of the device including the fixed body, dynamic body and trio of cleaning arms.
Figure 3:
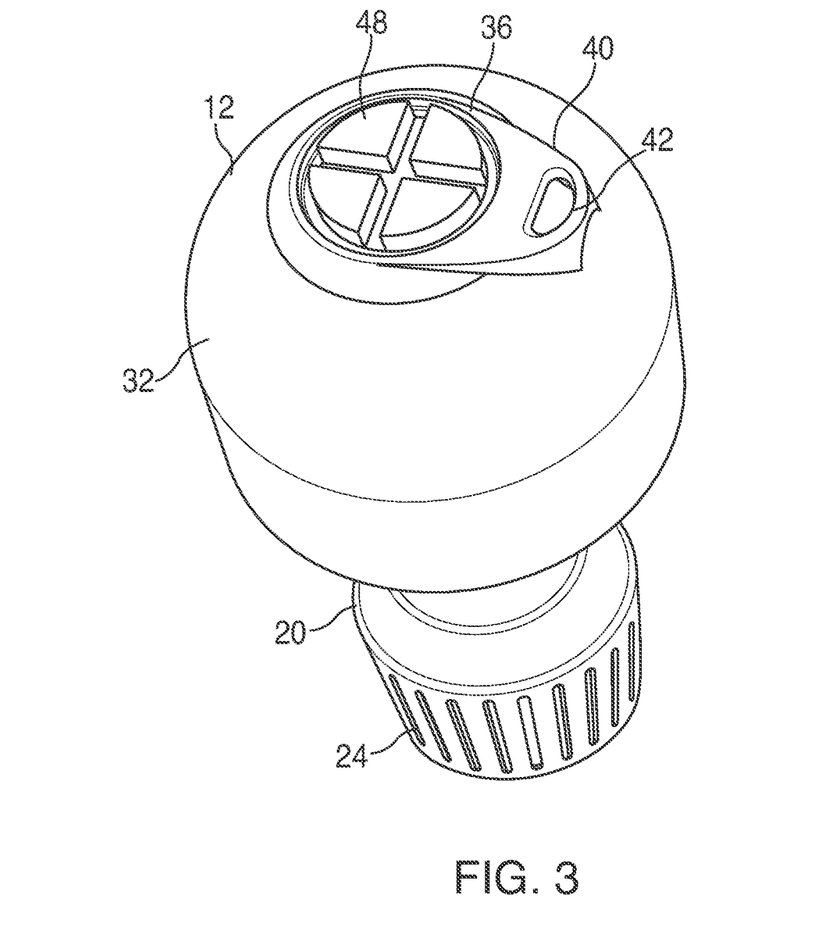
FIG. 3 is a third perspective view of a preferred embodiment of the maintenance device showing the top of the lubrication reservoir atop the fixed body and the abrasive block positioned on the reservoir.
Figure 4:
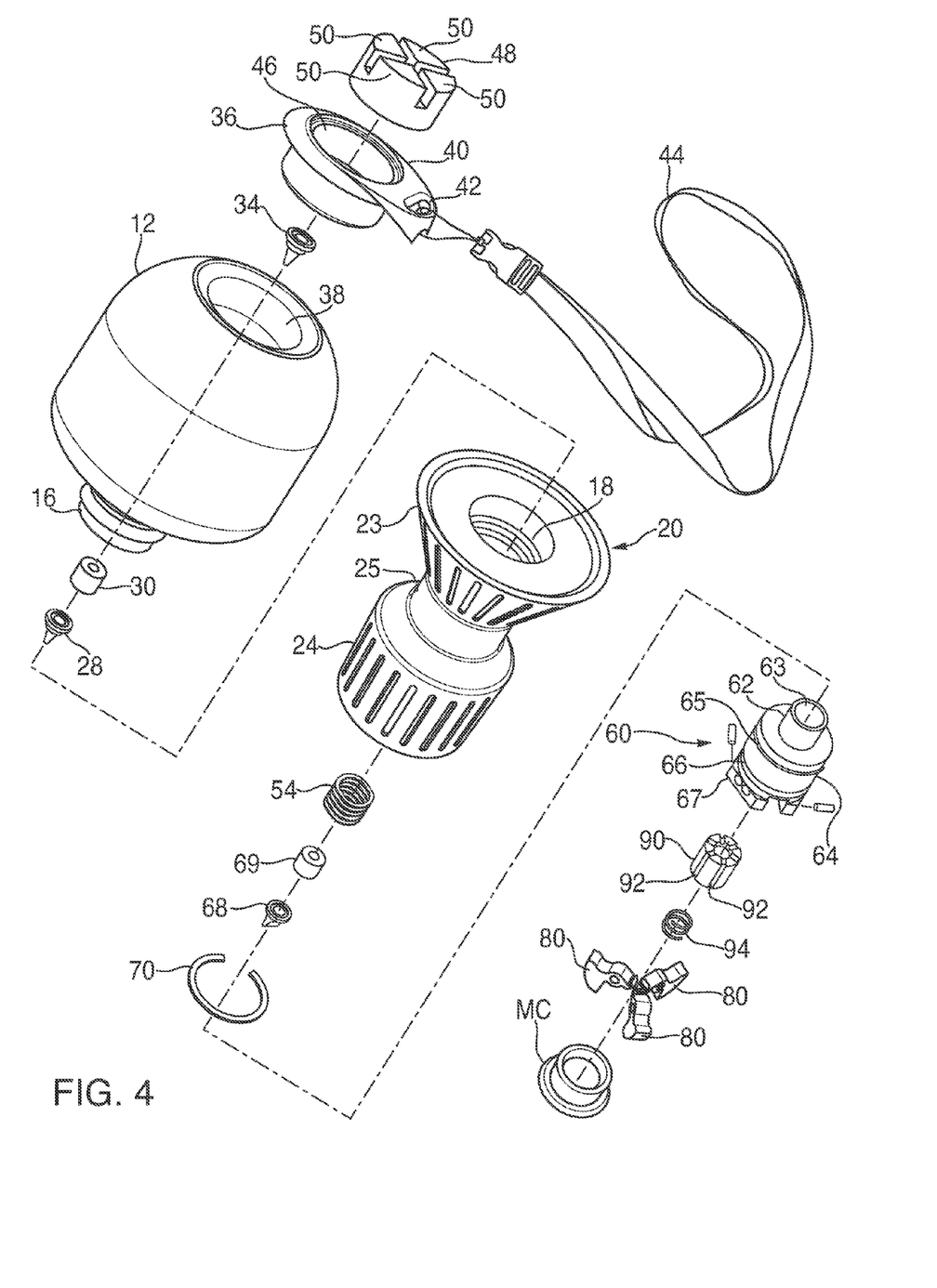
FIG. 4 is an exploded perspective view of a preferred embodiment of the maintenance device.
Figure 5:
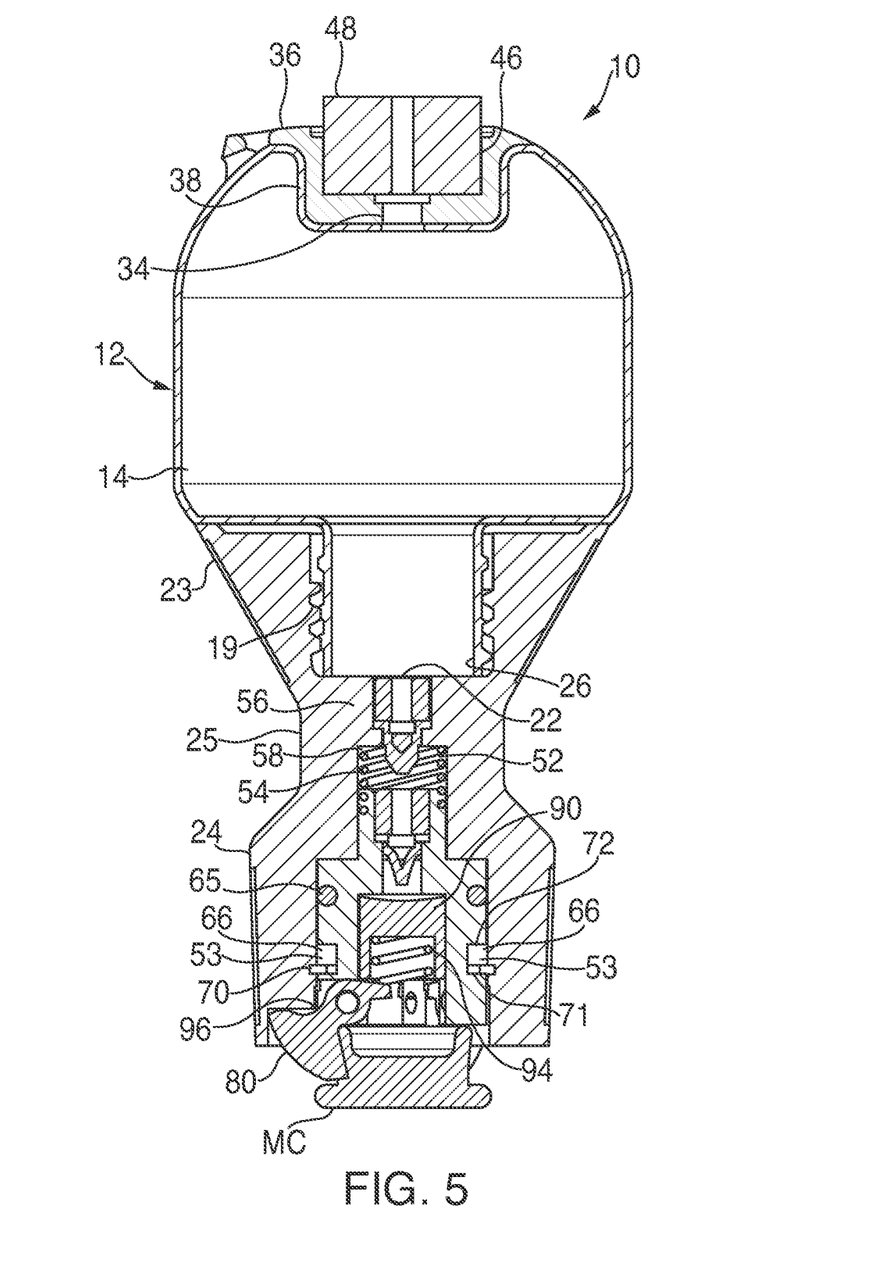
FIG. 5 is a cross section view of a preferred embodiment of the maintenance device.

With reference to FIGS. 1 through 5, there is shown a preferred embodiment of the maintenance device 10 of the present invention. In particular, FIGS. 1 through 4 illustrate a preferred embodiment of maintenance device 10, and FIG. 5 illustrates a cross-section view, illustrating the maintenance device 10 engaging and cleaning a male connector portion MC of a fastener.

Maintenance device 10 comprises a lubrication reservoir 12 defined by a bulbous bottle or container 14 for holding lubricant at the upper portion of maintenance device 10 (when maintenance device 10 is held upright). As shown in FIG. 4 and FIG. 5, lubrication reservoir 12 has a lower threaded end 16 that tapers at the bottom of reservoir 12. Threaded end 16 corresponds in diameter to threaded interior 18 of fixed body 20, enabling a user to selectively insert threaded end 16 within, and lock threaded end 16 to, fixed body 20. Lubrication reservoir 12 also includes an opening 22 through which lubricant enters reservoir 12 prior to use of maintenance device 10. By utilizing a threaded connection 19 between fixed body 20 and reservoir 12, the lubrication reservoir 12 may be filled and re-filled as desired by simply unscrewing and separating reservoir 12 from fixed body 20. Notwithstanding the preferred embodiment disclosed herein, it should be understood that another embodiment of the maintenance device may be constructed so that a lubrication reservoir is not removable once it is attached to fixed body. For example, a snap fit connection may be utilized between the reservoir and fixed body.

Fixed body 20 has a configuration comparable to that of a spool, with a flared upper end 23, a cylindrical lower end 24 and a cylindrical midsection 25 in between having a smaller diameter than cylindrical lower end 24. When fixed body 20 is connected to lubrication reservoir 12, the contour formed by flared upper end 23 transitions smoothly into the contour formed by the outer surface of lubrication reservoir 12. Moreover, as shown most clearly in FIG. 5, the wall of flared upper end 23 extends further outward (defining a larger diameter where said flared upper end 23 terminates) as compared to the wall of cylindrical lower end 24. The exterior surfaces of both flared upper end 23 and cylindrical lower end 24 comprise a knurled or other grip texture to enable a user to more easily grasp and control maintenance device 10 during use thereof. The textured surface allows a user to grip the maintenance device 10 and to manipulate and twist the maintenance device 10 as part of the cleaning and lubrication process. In a most preferred embodiment vertical grooves are provided for this purpose, although other designs and configurations may be provided.

During use of maintenance device 10, lubricant flows out of opening 22 at the lower end 26 of lubrication reservoir 12. With a pumping motion, explained in further detail below, lubricant continues to flow into fixed body 20 via a first valve 28 and hollow plug 30 positioned where opening 22 of lubrication reservoir 12 meets fixed body 20. Valve 28 also prevents undesired backflow of lubricant into reservoir 12.

As shown in FIG. 4, a reservoir air valve 34 is provided at the upper end 32 of lubrication reservoir 12, which enables air to enter the interior of container 14 of lubricant reservoir 12 to displace the lubricant that is pumped into fixed body 20 when maintenance device 10 is in use. Like valve 28, reservoir air valve 34 prevents backflow of lubricant even when device 10 is inverted. Preferably, the intake should allow sufficient air to displace lubricant as it is being utilized so that the lubricant container does not inwardly collapse. By the same token, the walls of the lubricant container should be of a sufficient thickness to resist collapsing through routine handling.

A reservoir cap 36 is provided at the upper end 32 of lubricant reservoir 12. Cap 36 is sized and adapted to fit securely in reservoir cavity 38. Optionally, cap 36 may be secured to cavity 32 by a conventional snap fit connection, adhesive and/or other mechanical forms of connection known to those of ordinary skill in the art. Cap 36 includes an extension tab 40 with an aperture 42 through which an adjustable wrist strap 44 is connected to cap 36.

Cap 36 also comprises a cap cavity 46 which defines a space in which abrasive block 48 is placed. In a preferred embodiment, abrasive block 48 comprises abrasive material and is sized and shaped to clean female portions of fasteners, particularly the interior portions thereof. Preferably, abrasive block 48 is partially divided into four analogous sections 50, 50, 50, 50 allowing each section to flex, bend and conform independently from one another to the contours of a fastener that is being cleaned. In a preferred embodiment, abrasive block 48 comprises wire brush type material that is sufficiently harsh to clean and scrub away dirt, salt and other corrosive material off of metallic fasteners. However, it should be understood that less harsh materials, such as terrycloth, may be utilized as well. Moreover, although presented in a round configuration, it should be appreciated that the shape of abrasive block 48 (and corresponding shapes of cap cavity 46 and reservoir cavity 38) may be modified. By the same token, depending on the nature of the abrasive material that is used, abrasive block 48 may be a single contiguous block (i.e., not subdivided).

Valve 28 separates lubricant in reservoir 12 from first pumping chamber 52 in the vicinity and interior of cylindrical midsection 25. At first pumping chamber 52, a first biasing spring 54 is positioned against divider 56 of fixed body 20. Within the interior of fixed body 20 beyond divider 56 there is a dynamic body 60 that is biased downward by biasing spring 54 positioned between the divider 56 and the upper portion of dynamic body 60. In order to prevent unwanted lateral movement of the first biasing spring 54, it is positioned within cavity 58. Biasing spring 54 is also positioned such that it presses against the top of dynamic body 60 and forces dynamic body 60 downward and away from valve 28 into a resting, relaxed or extended position. During use, dynamic body 60 imparts a pumping action that pumps lubricant from reservoir 12 through valve 28 when force is applied to dynamic body 60 to compress spring 54.

Dynamic body 60 has a cylindrical upper section 62 with an aperture 63 that sits atop of an intermediate cylindrical section or midsection 64. In a preferred embodiment, midsection 64 receives an O-ring 65 that is positioned either within a groove on the exterior surface of midsection 64 or on a smooth exterior surface thereof (i.e., without a groove). The base 67 of dynamic body 60 has a hexagonal configuration, three sides of which each accommodate a cleaning arm 80, 80, 80 that are shaped like a tomahawk or axe head and held in place by pins or other attachment means known to those of ordinary skill. In a preferred embodiment, cleaning arms 80, like abrasive block 48, comprises wire brush type material that is sufficiently harsh to clean and scrub away dirt, salt and other corrosive material off of metallic fasteners. However, it should be understood that less harsh materials, such as terrycloth, may be utilized as well. Furthermore, it should be understood that cleaning arms may formed entirely of metal with abrasive interior surfaces that can remove corrosive material from and clean metallic fasteners.

When dynamic body 60 is fitted with an O-ring 65, O-ring 65 helps divert and prevent lubricant from engaging the exterior of dynamic body 60 and the exterior surface of midsection 64, and instead helps direct at least some, but not necessarily all, lubricant through aperture 63. As lubricant travels through aperture 63 at the top of dynamic body 60, it passes through an additional valve 68 and plug 69. When dynamic body 60 is not fitted with an O-ring 65, additional lubricant may engage the exterior surface of midsection 64 when pumping lubricant from reservoir 12 into pumping chamber 52 and beyond. However, it should be appreciated that lubricant is still forced through aperture 63 and valve 68.

Between base 67 and midsection 64 is a stopper channel 66 within which a stopper or retaining ring 70 is positioned and held in place at the stationary lower end 24 of fixed body 20. The height or width of stopper channel 66 sets the upper limit and lower limit of how far dynamic body 60 is able to travel within the lower cavity of fixed body 20. When an opposing force is applied to dynamic body 60, first biasing spring 54 is compressed until the foot 71 of stopper channel 66 (or top of base 67) contacts retaining ring 70, as shown in FIG. 5. Dynamic body 60 is thus able to travel the height or width of stopper channel 66, which limits the distance that dynamic body 60 can extend and retract. In a preferred embodiment, stopper channel 66 spans about ¼-¾ of an inch. In this preferred embodiment, retaining ring 70, which serves as a 'stopper,' is kept stationary while stopper channel 66 is incorporated into dynamic body 60 and moves with dynamic body 60. However, it should be appreciated that a retaining ring or stopper may be incorporated into dynamic body with a stopper channel integrated into fixed body, with the stopper and channel working in tandem to limit the movement of dynamic body.

When the dynamic body 60 is in an extended position biased by spring 54, retaining ring 70 rests against the roof 72 of stopper channel 66. As cleaning arms 80, 80, 80 pivot and engage a male connector MC and dynamic body 60 retracts, stopper channel 66 moves relative to retaining ring 70 until foot 71 contacts retaining ring 70 where further interior movement of dynamic body 60 (relative to fixed body 20) is prohibited.

Interior of dynamic body 60 is a cylindrical drum 90 comprising a series of lubricating channels 92 running vertically along the exterior surface of drum 90. Inside of drum 90, a second biasing spring 94 is positioned which biases each of cleaning arms 80, 80, 80 into a relaxed, extended position. During use of maintenance device 10, the male connector portion MC engages cleaning arms 80, 80, 80. When sufficient force is applied by a user, cleaning arms 80, 80, 80 press against spring 94 forcing dynamic body 60 to withdraw and compress biasing spring 54. This movement leads to a reduction in chamber 52 as well as entry of additional lubricant, which eventually travels inside lubricating channels 92 to its destination at male connector portion MC. By the same token, as dynamic body 60 withdraws, cleaning arms 80, 80, 80 are progressively forced by the interior wall corner 96 of fixed body 20 to pivot inward toward a cleaning position from a flared position, until arms 80, 80, 80—and their respective cleaning surfaces—are moved into a substantially downwardly aligned position to press against and engage male connector portion MC. Thus, the retracting motion of the dynamic body 20 combined with the interior wall corner 96 urges the arms 80, 80, 80 inward toward a cleaning position.

When the male cleaning mechanism of maintenance device 10 is in use, the arms 80, 80, 80 bear against the exterior of the male connector portion MC. As the maintenance device 10 is twisted, the abrasive surface of the arms 80, 80, 80 clean corrosion and other unwanted build-up from male connector wall. Thereafter, upon disengagement of the device 10 from the top of the male connector portion MC, the second biasing spring 94 forces the arms 80, 80, 80 back to a relaxed and extended position.

In a preferred embodiment, the first biasing spring 54 is heavier and requires more force to compress than second biasing spring 96. This allows the cleaning arms 80, 80, 80 to retract and the second biasing spring 96 to compress without necessarily causing the dynamic body 60 retract and first biasing spring 54 to compress. However, when sufficient force is applied, both the arms 80, 80, 80 and the dynamic body 60 will compress thus allowing the valves 28, 68 to release lubricant.

In a static, unprimed position, before device 10 is first used to lubricate and/or clean male connector portion MC, upper reservoir valve 34 and valve 28 are closed. Biasing spring 54 is in an expanded position, holding dynamic body 60 in a relaxed position, with retaining ring 70 positioned against roof 72 of stopper channel 66. First pumping chamber 52 and ancillary chambers 53 are initially dry and empty. Spring 94 is also in an expanded position and arms 80, 80, 80 are in an open and relaxed position.

When first being used, a user applies force (typically in a downward and twisting direction) to the device 10. Upon the application of this force, spring 54 compresses and lubricant fills first pumping chamber 52 and ancillary chambers 53. Even with an O-ring 65, lubricant is forced on the external surface of dynamic body 60 and is released upon the outside of male connector portion MC. In addition, lubricant enters the interior of dynamic body 60 via valve 68 into channels 92 of drum 90. After travelling through channels 92, lubricant is released onto the inside of male connector portion MC. Retaining ring 70 is positioned against foot 71 of stopper channel 66. Cleaning arms 80, 80, 80 are forced to grip the external surfaces of male connector portion MC.

In a static, primed position, dynamic body 60 returns to a relaxed position, with retaining ring 70 positioned against roof 72 of stopper channel 66. Unlike the static, unprimed position, lubricant is already present in first pumping chamber 52 and ancillary chambers 53, at least one of which coincides with stopper channel 66. An ancillary chamber (not shown) for receiving lubricant is also positioned above cylindrical intermediate section 64 of dynamic body 60 when dynamic body 60 is in a relaxed position. (When dynamic body 60 is forced further inside during pumping, lubricant exits that chamber and is forced further along the paths to male fastener MC.) Spring 94 also returns to an expanded position and arms 80, 80, 80 are in an open and relaxed position. Notably, valve 28 opens as suction and pressure pull lubricant down from reservoir 12 to fill first pumping chamber 52 and ancillary chambers 53. Upper reservoir valve 34 also opens to allow air to displace the lubricant that has vacated the container 14.

The accompanying drawings only illustrate several embodiments of a maintenance device for a snap or fastener and its respective constituent parts, however, other types and styles are possible, and the drawings are not intended to be limiting in that regard. Thus, although the description above and accompanying drawings contains much specificity, the details provided should not be construed as limiting the scope of the embodiments but merely as providing illustrations of some of the presently preferred embodiments. The drawings and the description are not to be taken as restrictive on the scope of the embodiments and are understood as broad and general teachings in accordance with the present invention. While the present embodiments of the invention have been described using specific terms, such description is for present illustrative purposes only, and it is to be understood that modifications and variations to such embodiments, including but not limited to the substitutions of equivalent features, materials, or parts, and the reversal of various features thereof, may be practiced by those of ordinary skill in the art without departing from the spirit and scope of the invention.

The invention claimed is:

1. A maintenance device for a fastener, comprising:
   fixed body having an interior and an upper end and a lower end;
   a lubricant reservoir, said lubricant reservoir being removably attached with a threaded connection to said upper end of said fixed body;
   a dynamic body positioned within said fixed body, said dynamic body comprising a hexagonal base having six sides, a cylindrical midsection and an O-ring positioned around said cylindrical midsection;
   a first biasing spring positioned between said fixed body and said dynamic body, said first biasing spring biasing said dynamic body in a downward direction; and
   a plurality of cleaning arms, each pivotally connected to one said sides of hexagonal base of dynamic body;
   wherein when said dynamic body is pressed against said first biasing spring and said first biasing spring is compressed, said cleaning arms pivot to a closed position to engage said fastener.

2. The maintenance device of claim 1, further comprising a drum housed within said dynamic body, and a second biasing spring positioned between said drum and said cleaning arms, said second biasing spring biasing said cleaning arms to an open position.

3. The maintenance device of claim 2, said drum having lubricating channels along the exterior surface of said drum.

4. The maintenance device of claim 3, further comprising a first valve between said lubricant reservoir and said dynamic body, wherein when said dynamic body is pressed against said first biasing spring and said first biasing spring is compressed, lubricant is released from said first valve.

5. The maintenance device of claim 4, further comprising a retaining ring and a stopper channel on dynamic body, wherein said retaining ring and stopper channel maintain said dynamic body within the interior of the fixed body.

6. A maintenance device for a fastener, comprising:
   a fixed body having an interior and an upper end and a lower end;
   a lubricant reservoir, said lubricant reservoir being removably attached to said upper end of said fixed body;
   a dynamic body positioned within said fixed body;
   a first biasing spring positioned between said fixed body and said dynamic body, said first biasing spring biasing said dynamic body in a downward direction;
   a plurality of cleaning arms pivotally connected to said dynamic body;
   a first valve positioned between said lubricant reservoir and said fixed body that releases lubricant from said lubricant reservoir when said dynamic body compresses said first biasing spring;
   wherein when said dynamic body is pressed against said first biasing spring and said first biasing spring is compressed, said cleaning arms pivot to engage said fastener; and
   wherein said cleaning arms have an abrasive surface; and
   wherein when said first valve releases lubricant, lubricant enters an interior of said dynamic body.

7. A maintenance device for a fastener, comprising:
   a fixed body having an interior and an upper end and a lower end;
   a lubricant reservoir at said upper end of said fixed body;
   a dynamic body positioned within said fixed body;
   a first biasing spring positioned between said fixed body and said dynamic body, said first biasing spring biasing said dynamic body in a downward direction;
   a plurality of cleaning arms pivotally connected to said dynamic body;
   a retaining ring and a stopper channel, wherein said retaining ring and stopper channel maintain said dynamic body within the interior of the fixed body;
   wherein when said dynamic body is pressed against said first biasing spring and said first biasing spring is compressed, said cleaning arms pivot to engage said fastener.

8. A maintenance device for a fastener, comprising:
   a fixed body having an interior and an upper end and a lower end;
   a lubricant reservoir at said upper end of said fixed body;
   a dynamic body positioned within said fixed body;
   a first biasing spring positioned between said fixed body and said dynamic body, said first biasing spring biasing said dynamic body in a downward direction;
   a plurality of cleaning arms pivotally connected to said dynamic body;
   a drum disposed within said dynamic body and a second biasing spring positioned interior of said drum, wherein said cleaning arms are initially biased outward and then pivot inward when said second biasing spring is compressed;
   wherein when said dynamic body is pressed against said first biasing spring and said first biasing spring is compressed, said cleaning arms pivot to engage said fastener.

9. The maintenance device of claim 8, wherein said first biasing spring is heavier than said second biasing spring.

10. The maintenance device of claim 8, wherein said drum comprises lubrication channels running vertically along the exterior surface of said drum.

11. The maintenance device of claim 1, further comprising an abrasive block positioned atop said lubrication reservoir.

12. The maintenance device of claim 1, further comprising a lubrication chamber between said reservoir and said dynamic body.

13. A maintenance device for a fastener, comprising:
   a fixed body having an interior and an upper end and a lower end;
   a lubricant reservoir, said lubricant reservoir attached to said upper end of said fixed body;
   a dynamic body positioned at the lower end of said fixed body;
   a first biasing spring positioned inside said fixed body, said first biasing spring biasing said dynamic body in a downward direction;
   a plurality of cleaning tomahawk arms pivotally connected by pins to said dynamic body; and
   a second biasing spring positioned to bias each of said plurality of cleaning tomahawk arms to an open position;
   wherein when said second biasing spring is compressed, said cleaning arms pivot to a closed position to engage said fastener.

14. The maintenance device of claim 13, further comprising a cap atop said lubrication reservoir and an abrasive block positioned on said cap.

15. The maintenance device of claim 13, said dynamic body comprising an aperture through which lubricant flows to said plurality of cleaning arms when said dynamic body compresses said first biasing spring.

16. The maintenance device of claim 15, said dynamic body comprising a hexagonal base with six sides, wherein each of said plurality of cleaning arms is positioned at one of six sides of said hexagonal base.

17. A maintenance device for a fastener, comprising:
a fixed body having an interior and an upper end and a lower end;
a lubricant reservoir positioned at said upper end of said fixed body;
a dynamic body positioned at the lower end of said fixed body;
a first biasing spring positioned between said fixed body and said dynamic body, said first biasing spring biasing said dynamic body in a downward direction;
a plurality of cleaning arms pivotally connected to said dynamic body;
a first valve positioned between said lubricant reservoir and said fixed body that releases lubricant from said lubricant reservoir when said dynamic body compresses said first biasing spring;
wherein when said dynamic body is pressed against said first biasing spring and said first biasing spring is compressed, said cleaning arms pivot to engage said fastener; and
wherein when said first valve releases lubricant, lubricant enters an interior of said dynamic body.

18. The maintenance device of claim 17, further comprising a drum disposed within said dynamic body and a second biasing spring positioned interior of said drum, wherein said cleaning arms are initially biased outward and then pivot inward when said second biasing spring is compressed.

19. The maintenance device of claim 18, wherein said first biasing spring is heavier than said second biasing spring.

20. The maintenance device of claim 18, wherein said drum comprises lubrication channels running vertically along the exterior surface of said drum.

21. A maintenance device for a fastener, comprising:
a fixed body having an interior and an upper end and a lower end;
a lubricant reservoir, said lubricant reservoir at said upper end of said fixed body;
a dynamic body positioned at said lower end of said fixed body;
a first biasing spring positioned inside said fixed body, said first biasing spring biasing said dynamic body in a downward direction;
a valve to release lubricant from said lubricant reservoir;
a plurality of cleaning arms pivotally connected to said dynamic body; and
a second biasing spring positioned to bias each of said plurality of cleaning arms to an open position;
wherein when said second biasing spring is compressed, said cleaning arms pivot to a closed position to engage said fastener; and
wherein when said valve releases lubricant, lubricant enters an interior of said dynamic body.

22. The maintenance device of claim 21, further comprising a cap atop said lubrication reservoir.

23. The maintenance device of claim 22, further comprising an abrasive block positioned on said cap.

* * * * *